Patented Dec. 11, 1923.

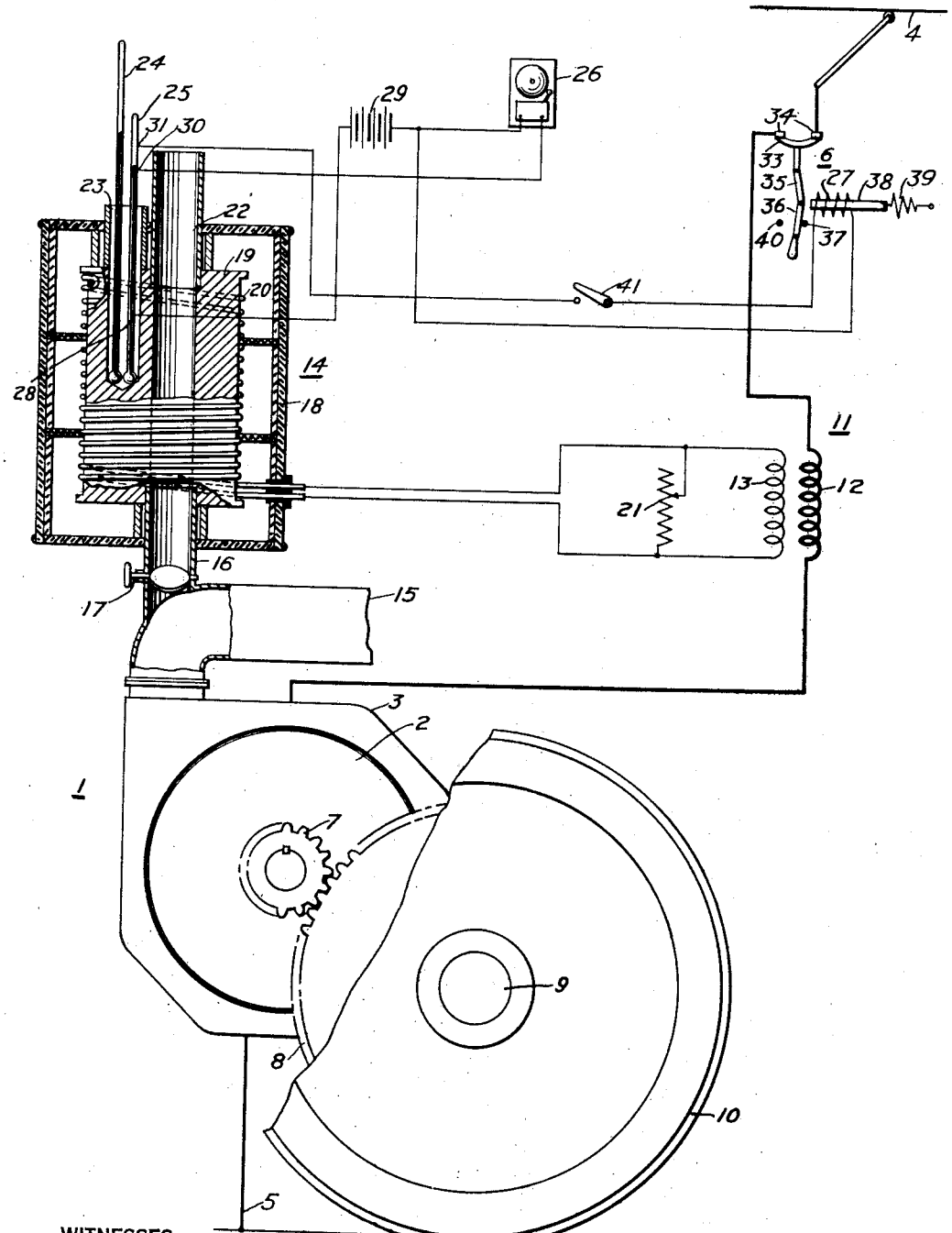

1,477,455

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed April 18, 1917, Serial No. 162,890. Renewed August 6, 1923.

*To all whom it may concern:*

Be it known that I, KARL A. SIMMON, a citizen of the United States, and a resident of Edgewood Park, in the county of Allegheny and State of Pennsylvania, have invented a new and useful Improvement in Electrical Systems, of which the following is a specification.

My invention relates to electrical systems and particularly to systems for protecting electrical apparatus against abnormally high temperatures by reason of the current flowing therethrough.

One object of my invention is to provide an electrical system for electrical apparatus which shall operate an alarm when the temperature thereof is raised to a predetermined point and shall break the circuit of the electrical apparatus when the temperature thereof is raised to a second predetermined point.

Another object of my invention is to provide an electrical system of the above-indicated character for protecting a dynamo-electric machine, having a ventilating system, against injury by reason of the heat effected by the current flowing therethrough and embodying a thermal device which shall be jointly controlled by the current and the ventilating fluid supplied to the machine, for operating an alarm and for breaking the circuit of the dynamo-electric machine under predetermined conditions.

In operating electrical apparatus, as, for example, a dynamo-electric machine, it is essential to guard against an excessive temperature rise in the apparatus which would injure or destroy the insulating material contained therein. The temperature rise in many dynamo-electric machines is substantially proportional to the current flowing therethrough but, in many classes of machines now in service, such, for example, as electric railway motors, the machines are provided with ventilating systems for cooling them and for which due allowance must be made if the temperature rise in the machines is determined by ascertaining the amount of current supplied thereto. Thus, it is impractical to govern protective systems for an electric railway motor solely in accordance with the current supplied thereto.

In a system constructed in accordance with my invention, a thermal device is provided which is jointly controlled by the ventilating fluid and the current supplied to the dynamo-electric machine, and is provided with means for operating an alarm when the temperature of the machine is raised to a predetermined point, and for breaking the circuit of the machine when the temperature of the latter is raised to a second predetermined point.

The single figure of the accompanying drawing is a diagrammatic view of an electrical system constructed in accordance with my invention.

Referring to the accompanying drawing, a motor 1, comprising an armature 2 and a frame structure 3, is adapted to be connected across a supply circuit comprising a trolley conductor 4 and a ground-return conductor 5 by means of a circuit breaker 6. A pinion 7, which is mounted on the armature shaft of the motor 1, is adapted to mesh with a gear wheel 8 which is mounted on a driving axle 9 of an electric vehicle. The axle 9 is provided with driving wheels 10, one only of which is illustrated. A transformer 11, comprising a primary winding 12, which is included in the circuit of the motor 1, and a secondary winding 13, is associated with a thermal device 14, the function of which will be described later. A ventilating system 15 is provided for supplying ventilating fluid for cooling the motor 1 and also for supplying a limited amount of ventilating fluid to the thermal device 14 through a part 16 which is controlled by a valve 17.

The thermal device 14 embodies a hollow cylindrical casing 18 composed of an insulating substance within which is disposed a cylinder 19 of steel or similar material. A coil 20, which is connected to the secondary winding 13 of the transformer 11, is non-inductively wound upon the cylinder 19 and is insulated therefrom by any well-known insulating material, such, for example, as sheet mica. An adjustable resistor 21 is connected across the terminals of the secondary winding 13 for regulating the amount of current that is supplied to the coil 20. The thermal device 14 is provided with an opening 22 therethrough for permitting the free passage of ventilating fluid from the ventilating system 15, and the steel cylinder 19 is provided with a pocket 23 to receive two mercury thermometers 24 and 25. The thermometer 24 serves to indicate the temperature of the thermal device and the thermometer 25 serves to close the circuit of an alarm device 26 and that of the trip coil 27 of the circuit breaker 6. The thermometer 25 is provided with a contact terminal 28, which is connected to a battery 29, a contact terminal 30 which is connected to one terminal of the alarm device 26, and a contact terminal 31 which is connected to one terminal of the trip coil 27. The other terminals of the alarm device 26 and of the trip coil 27 are connected to the terminal of the battery 29 which is opposite to that having connection to the contact terminal 28. Thus, the circuits of the alarm device 26 and of the trip coil 27 are controlled by the mercury within the thermometer 25 which engages the contact terminals 28, 30 and 31.

The circuit breaker 6 embodies a movable contact member 33, which is adapted to brige contact terminals 34 when in the position shown and is actuated by toggle levers 35 and 36. When the circuit breaker 6 is manually set in the position illustrated in the drawing, the lever 36 is held firmly against a pin 37 to maintain the member 33 in its closed position. However, when the trip coil 27 is energized its movable core 38 is moved, against the opposition of a spring 39, to engage the joint between the levers 35 and 36 and move it toward the left until the lever 36 engages a pin 40 which is so disposed as to permit the contact member 33 to be disengaged from the contact terminals 34. A switch 41 is provided for breaking the circuit of the trip coil 27 in case of emergency when it is desired to operate the motor 1 regardless of the attendant damage which may be caused by an excessive current flowing therethrough.

The valve 17, which is associated with the ventilating system 15 and the thermal device 14, and the resistor 21, which is associated with the transformer 11 and the thermal device 14, may be so adjusted that the temperature of the thermal device 14 varies directly with the temperature of the motor 1. Thus, if the motor 1 is supplied with an excessive current and is overheated thereby, the temperature of the thermal device 14 will be similarly raised by means of the coil 20 which is connected to the transformer 11, whereby the mercury in the thermometer 25 will expand to connect the contact terminals 28 and 30. When the contact terminals 28 and 30 are connected, a circuit is completed through the alarm device 26 and the latter is operated to give an indication that the motor 1 is being supplied with an excessive current and is being overheated.

In case the temperature of the motor 1 continues to increase, the temperature of the thermal device 14 will be similarly raised until the mercury within the thermometer 25 bridges the contact terminals 31 and 28 to complete a circuit from the battery 29 through the trip coil 27 of the circuit breaker 6.

Although thermometers containing mercury therein are illustrated for closing the circuit of the alarm device 26 and that of the coil 27, it is to be understood that any other well-known thermostatic device may be utilized for closing these circuits in accordance with the temperature of the thermal device 14.

Modifications in the structure and arrangement and location of parts may be made within the spirit and scope of my invention and such modifications are intended to be covered by the appended claims.

I claim as my invention:

1. In an electrical system, the combination with a dynamo-electric machine having a ventilating system, and an auxiliary device, of means controlled by the current flowing through said machine and by the ventilating fluid supplied by said ventilating system for causing said device to operate.

2. In an electrical system, the combination with a dynamo-electric machine having a ventilating system, a supply circuit connected thereto, and an auxiliary device, of means governed by the current and the ventilating fluid supplied to said machine for causing said device to operate and for effecting interruption of the circuit of said machine.

3. In an electrical system, the combination with a supply circuit, a dynamo-electric machine connected to the supply circuit, and a ventilating system for said machine, of means governed by the ventilating fluid and the current supplied to said machine for breaking the circuit of said machine, under predetermined conditions.

4. In a system for electrical apparatus, an auxiliary device, means for ventilating said apparatus, means directly influenced by such ventilation for operating said device when the temperature of said apparatus reaches a predetermined point, and further means also directly influenced by the same ventilation for breaking the circuit of said apparatus when the temperature of the apparatus increases to a second predetermined point.

5. In an electrical system, the combination with a supply circuit, a dynamo-electric machine having a ventilating system, a circuit breaker for connecting said machine to the supply circuit, and an auxiliary device, of means governed by said ventilating system and by the current supplied to the motor for controlling the operation of said device and that of the circuit breaker.

6. In an electrical system, the combination with an electrical apparatus having a ventilating system connected thereto, a supply circuit for said apparatus, an auxiliary device, and an interrupter for said supply circuit, of a thermal device associated with said ventilating system and having a heating coil connected to the circuit of said electrical apparatus, and means governed by the temperature of said thermal device for causing said auxiliary device and said circuit interrupter to operate.

7. In an electrical system, the combination with a supply circuit, a dynamo-electric machine connected across the supply circuit, and a ventilating system for said dynamo-electric machine, of a transformer inserted in the circuit of said machine, a thermal device governed by the current flowing through said transformer and by the ventilating air supplied to said machine, and a circuit breaker governed by said thermal device.

8. In an electrical system, the combination with a translating device having a ventilating system, of a thermal apparatus controlled in accordance with both the current and the ventilating fluid traversing said device.

9. In an electrical system, the combination with a translating device having a ventilating system, of an electrical apparatus for governing the operation of said translating device, and means for supplying said apparatus with current and with ventilating fluid in accordance with those supplied to said translating device.

10. In an electrical system, the combination with a supply circuit, a motor connected across the supply circuit and provided with a ventilating system, a thermal device associated with said motor and connected to said ventilating system, and an auxiliary device connected to the thermal device, of a transformer inserted in the circuit of the motor and connected to said thermal device, and means, comprising said transformer, the ventilating system and the thermal device, for causing said auxiliary device to operate when the temperature of said motor is raised to a predetermined point and for causing interruption of the motor circuit when the temperature thereof reaches a second predetermined point.

11. The combination with a translating device, of a hollow metallic member having heating characteristics like said device, and means for cooling said member similarly to the cooling of said device.

12. The combination with a translating device, of a hollow metallic member having heating characteristics like said device, and means for forcing a cooling medium through said hollow member.

13. The combination with an electric motor, of a hollow metallic member adapted to be heated like said motor, and means for sending a cooling medium through said motor and said member.

In testimony whereof, I have hereunto subscribed my name this 29th day of March, 1917.

KARL A. SIMMON.